A. DAVINO.
CABLE CONTROLLED CARRYING APPARATUS.
APPLICATION FILED JAN. 27, 1919.
1,360,097.
Patented Nov. 23, 1920.
3 SHEETS—SHEET 2.
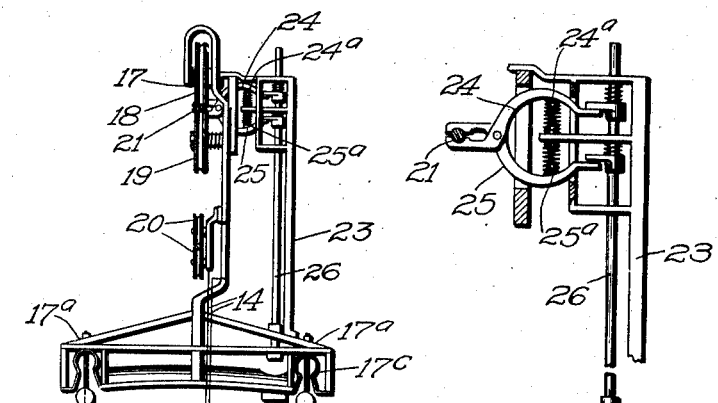
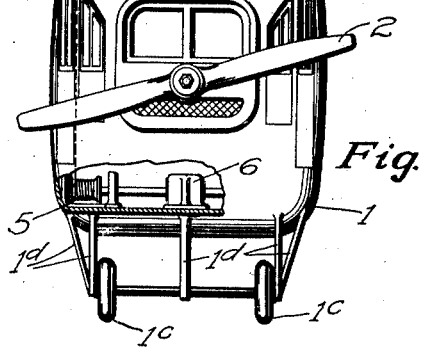
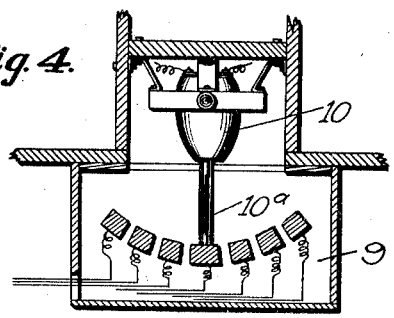
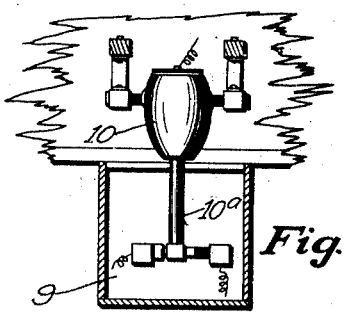
INVENTOR.
ALPHONSO DAVINO
BY A. B. Bowman
ATTORNEY

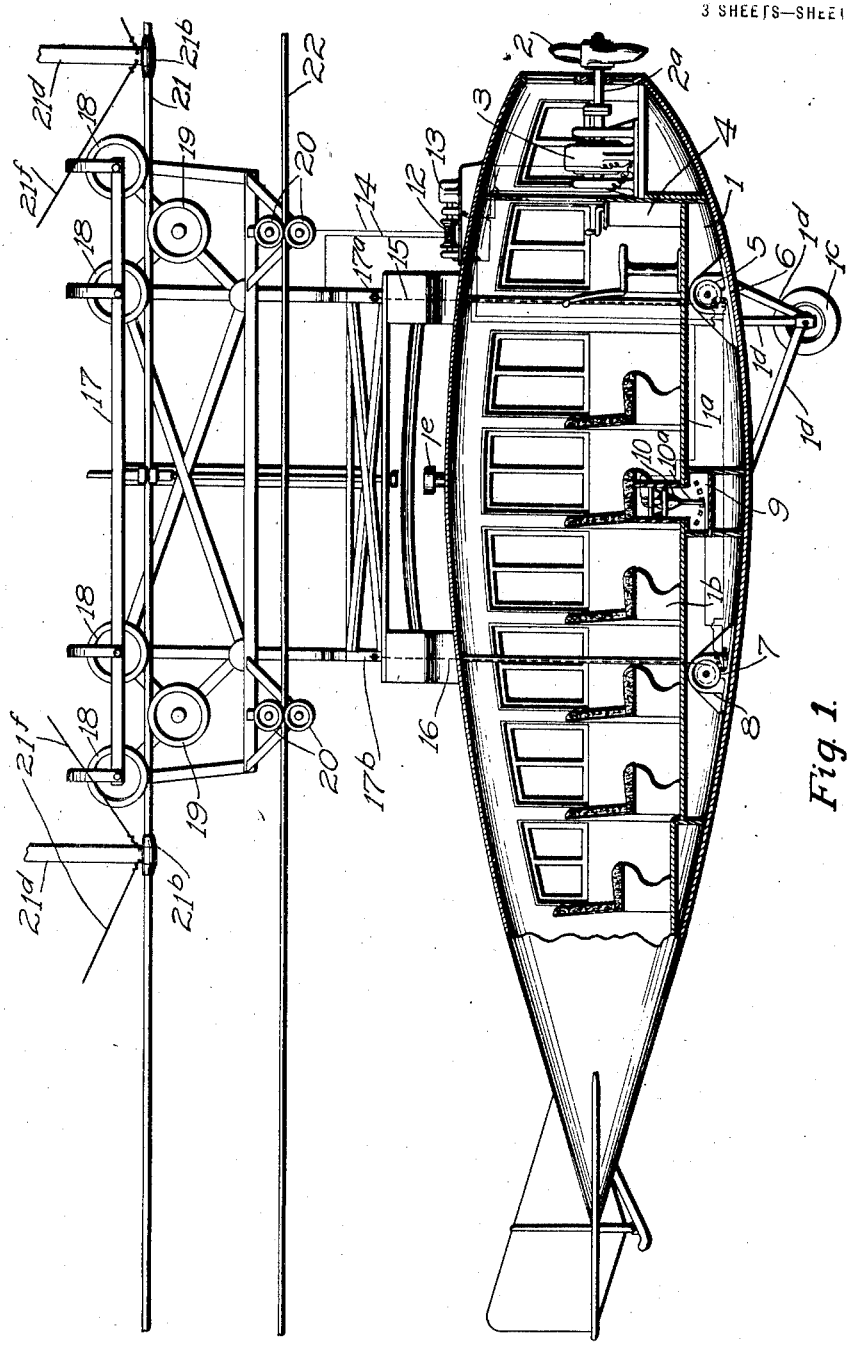

A. DAVINO.
CABLE CONTROLLED CARRYING APPARATUS.
APPLICATION FILED JAN. 27, 1919.

1,360,097.

Patented Nov. 23, 1920.
3 SHEETS—SHEET 3.

INVENTOR.
ALPHONSO DAVINO
BY A.B.Bowman
ATTORNEY

UNITED STATES PATENT OFFICE.

ALPHONSO DAVINO, OF LOS ANGELES, CALIFORNIA.

CABLE-CONTROLLED CARRYING APPARATUS.

1,360,097.  Specification of Letters Patent.  Patented Nov. 23, 1920.

Application filed January 27, 1919. Serial No. 273,247.

*To all whom it may concern:*

Be it known that I, ALPHONSO DAVINO, a citizen of the United States, residing at Los Angeles, in the county of Los Angeles and State of California, have invented certain new and useful Improvements in Cable-Controlled Carrying Apparatus, of which the following is a specification.

My invention relates to an apparatus for carrying purposes which is preferably in the form of a combined dirigible and aeroplane carrying device or may be either dirigible or aeroplane in form as desired and it is suspended from a supporting cable by other cables and adapted to be raised and lowered between said supporting cable and the earth as desired and the objects of my invention are, first, to provide an apparatus of this class with means for controlling the position of the carrying device relatively to the supporting cable; second, to provide a new and novelly braced supporting cable adapted to prevent its sagging between supports; third, to provide for an automatic control for balancing the carriage so as to provide for its equilibrium; fourth, to provide for electrical control of a portion of the apparatus; fifth, to provide a brake means for stopping and holding the carriage by frictional engagement with the supporting cable; sixth, to provide a new and novel cable carriage and cable support; seventh, to provide an apparatus to assist students beginning to learn aviation, and, eighth, to provide an apparatus of this class which is simple, durable, economical of construction, safe, will not readily get out of order and inexpensive to operate.

Figure 6:
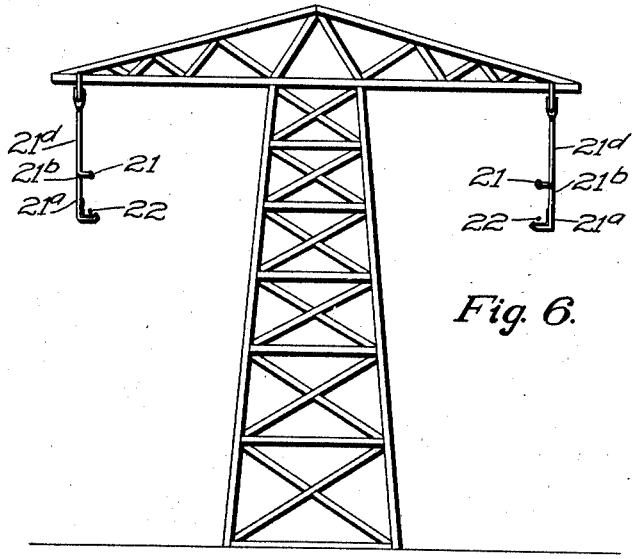
Figure 7:
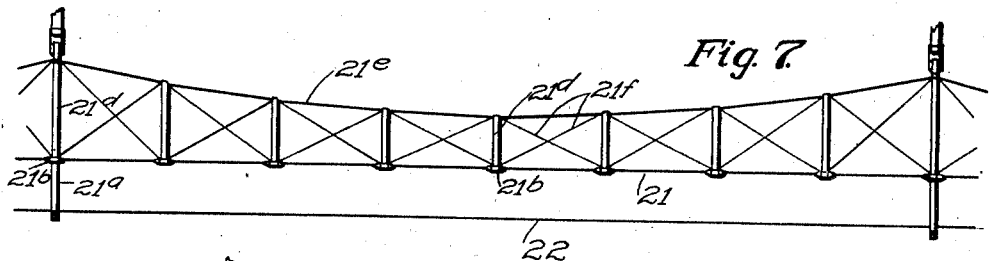
Figures 8, 9, 10:
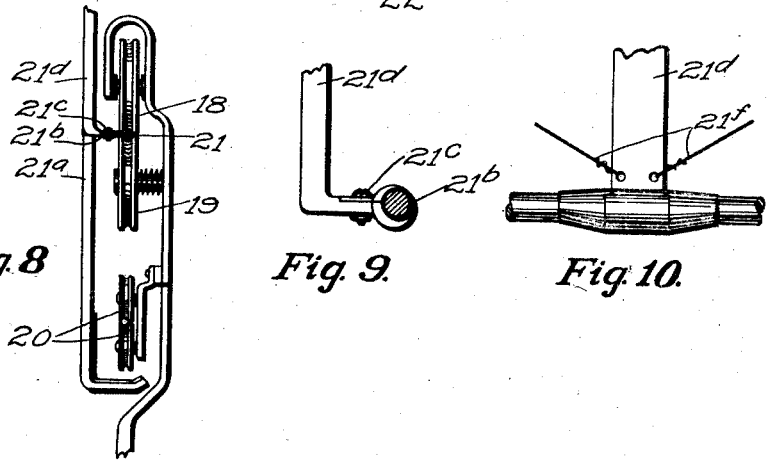

With these and other objects in view as will appear hereinafter my invention consists of certain novel features of construction, combination and arrangement of parts and portions as will be hereinafter described in detail and more particularly set forth in the appended claims reference being had to the accompanying drawings and to the characters of reference thereon which form a part of this application in which:

Figure 1 is a longitudinal sectional view of the carrying device portion of my apparatus and showing some of the parts in elevation to facilitate the illustration, the carrying device portion being shown in a position just ready to engage the cable carriage portion; Fig. 2 is a front elevational view of the apparatus complete showing some of the portions broken away and in section to facilitate the illustration; Fig. 3 is a front elevational view of the brake device showing some of the parts fragmentarily; Fig. 4 is a side elevational view of a gyroscope and directly connected motor for operating the same shown incased and with a portion thereof in engagement with a rheostat bar; Fig. 5 is a similar view at a right angle thereto; Fig. 6 is a side elevational view of the cable support showing the cable mounted thereon; Fig. 7 is a side elevational view of the cable showing the means of suspending the supporting cable between the supports thus reducing the sag in said supporting cable; Fig. 8 is a front elevational view on an enlarged scale of a fragmentary portion of the cable carriage and cable support in their relative positions; Fig. 9 is an enlarged side elevational view of the means for connecting the bracing members to the supporting cable and Fig. 10 is a similar view at a right angle thereto.

Similar characters of reference refer to similar parts and portions throughout the several views of the drawings.

The carriage body 1, propeller 2, motor 3, rheostat 4, front drums 5, front motor 6, rear drums 7, rear motor 8, rheostat 9, gyroscope and motor 10, engaging device 11, drum 12, motor 13, conductor cables 14, suspension cables 15, and 16, carriage frame 17, upper supporting wheels 18, locking wheels 19, trolley wheels 20, supporting cable 21, conducting cable 22, brake support 23, brake members 24 and 25, and brake operating rod 26 constitute the principal parts and portions of my apparatus.

The carriage body 1 is preferably in the form of a combined dirigible and aeroplane as shown best in Figs. 1 and 2 of the drawings and provided with a sub floor 1ª therein upon which is mounted a plurality of seats 1ᵇ. Mounted between the sub floor 1ª and the bottom of the carriage body on opposite sides and secured to said carriage body bottom is a pair of drums 5 which drums are directly connected to the motor 6 on opposite sides thereof and spaced apart therefrom some distance back on opposite sides is another pair of drums 7 which drums are directly connected to the motor 8 on opposite sides thereof. Mounted in the middle of said carriage body intermediate the motors 6 and 8 and immediately beneath the supporting members of one of the seats is the gyroscope and its operating motor in a casing 10 which is provided with an extending member $10^a$ which engages with the bar of rheostat 9 at its lower end. Mounted on each of the drums 5 is a cable 15 which extends upwardly through the top of the carriage body 1 and it is secured to the carriage frame at points $17^a$ and mounted on each of the drums 7 is a cable 16 which extends upwardly through the body 1 and is secured to the carriage 17 at points $17^b$. The carrying device body is supported on the ground when resting thereon by means of wheels $1^c$ mounted on supports $1^d$. Mounted in the front end of the vehicle body 1 is the motor 3 to which is secured the propeller shaft $2^a$ upon the outwardly extended end of which is secured the propeller 2. This motor 3 is controlled by the operator in the conventional way. Mounted in front of the operator is a rheostat 4 which is electrically connected to the motor 6 for controlling said motor 6. It will be here noted that all the motors including 3, 6, 8 and 13 receive their electrical energy through the conducting cable 22 and the supporting cable 21 and the conducting cables 14 connect with the trolley wheels 20 which conduct the current to the various motors through their rheostats.

It will also be noted that the vehicle body 1 is raised and lowered by the pairs of cables 15 and 16 by winding and unwinding on the drums 5 and 7, that the drums 5 and motor 6 are manually controlled by the rheostat 4 and the drums 7 and motor 8 are automatically controlled by the gyroscope in connection with the rheostat 9. The gyroscope 10 and rheostat 9 synchronize the motor 8 with the motor 6 so that the body of the vehicle is supported in equilibrium at all times as the cables 15 and 16 wind evenly on the drums 5 and 7. The objects of the drums 12 and motor 13 are for the purposes of keeping the circuit conducting wires 14 taut at all times. The cable carriage consists of a frame 17 shaped as shown best in Figs. 1, 2 and 8 of the drawings. The four upper wheels 18 are revolubly mounted on the frame 17 and are provided with grooves $18^a$ adapted to ride on the cable 21. The wheels 19 are similarly constructed and are adapted to ride below said cable and normally engage with the lower surface thereof as shown in Fig. 6 of the drawings. These wheels 19 prevent the wheels 18 from leaving this cable 21. The trolley wheels 20 travel on opposite sides of the conducting cable 22 and conduct the electrical current to the various motors through the wires 14 as hereinbefore set forth. The frame 17 is provided with four spring clip members $17^c$ with which the members 11 on the carriage 1 engage when said carriage is drawn up into its proper position relatively to said carriage thus forming a suspension support and connection between the carriage body 1 and cable carriage 17. Mounted on the carriage body 1 is an upwardly extending member $1^e$ which engages with the brake operating member 26 when the passenger carriage body 1 is in traveling position and which presses the rod 26 upwardly, permitting the springs $24^a$ and $25^a$ to open the ends of the members 24 and 25 thus releasing the brake from the cable.

When the carriage 1 is lowered however, the rod 26 is released and the cable engaging members 24 and 25 are pressed against the wire by means of springs $24^a$ and $25^a$. This brake mechanism is supported on the frame 17 by means of support 23. The supporting cable 21 is supported between the supports $21^a$ by means of clamp members $21^b$ which are clamped onto said cable by means of a bolt $21^c$ and extending from said clamp is a support on a normally horizontal plane spaced a slight distance from said cable then extending upwardly is a member $21^d$ and to the top ends of this member $21^d$ is secured a suspension cable $21^e$ which connect the supports $21^a$ which support $21^a$ is suspended from above as shown best in Fig. 6 of the drawings and connecting the several members $21^d$ are diagonal bracing wires $21^f$.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with the above described apparatus there is provided a cable controlled carrying device in the form of a combined dirigible and aeroplane which carrying device may be readily raised and lowered from the ground to a position near the cables and to the ground as desired, that said carrying device will be moved along the cable by means of the propeller 2 and controlled by means of motors, that there is provided an automatic device for holding the carriage in longitudinal position relatively to said cable when the passenger carrying device is lowered, that the vehicle is raised and lowered in a normally horizontal position by means of the synchronizing of the motor 8 with the motor 6 by means of the gyroscope operating the rheostat control of said motor 8, that the motors receive their source of electrical energy from the cables 21 and 22 and the lead wires 14 from the trolley wheels 20 engaging with the wire 22, that the particular construction of carriage and cable supports provide a safety device whereby the cable carriage is held in position on the cable; that the apparatus as a whole is safe, durable and easy to operate.

Having thus described my invention what I claim as new and desire to secure by Letters Patent is:

1. In an apparatus of the class described, a pair of electric circuit carrying cables, a carriage mounted on said cables, another carriage suspended from said first mentioned carriage by means of cables and drums upon which said cables are wound, secured to said last mentioned carriage, means for manually operating some of said drums and means for synchronizing other of said drums with said first mentioned drums and a brake for engaging said cable simultaneously with the lowering of the suspended carriage.

2. In an apparatus of the class described, a pair of electric circuit carrying cables, a carriage mounted on said cables, another carriage suspended from said carriage by means of cables, drums upon which said cables are wound secured to said vehicle, means for manually operating some of said drums, means for synchronizing other of said drums with said first mentioned drums, a propeller mounted on said carriage for moving said carriage on said cables, and a brake for engaging one of said cables simultaneously with the lowering of the suspended carriage.

3. In an apparatus of the class described, a pair of electrical circuit carrying cables, a carriage mounted on said cables, a vehicle suspended from said carriage by means of cables, drums upon which said cables are wound secured to said vehicle, means for manually operating some of said drums, means for synchronizing other of said drums with said first mentioned drums, a propeller mounted on said vehicle for moving said vehicle and said carriage on said cables, means for locking said carriage on said cables, and a brake for engaging one of said cables simultaneously with the lowering of said vehicle.

4. In an apparatus of the class described, the combination of a pair of electrically energized cables, means for supporting them, the one above the other, a carriage comprising a plurality of wheels adapted to ride on one of said cables, and a plurality of other wheels adapted to ride with their peripheries engaging the lower surface of said cable for locking said carriage on said cable, a passenger carrying device suspended from said carriage, motor and drum means secured to said passenger carrying device for raising and lowering said passenger carrying device relatively to said carriage and a brake for engaging one of said cables simultaneously with the lowering of said passenger carrying device.

5. In an apparatus of the class described, the combination with a carriage mounted on cables, of cables attached to said carriage, a passenger carrying device suspended on said cables, revolubly mounted drums upon which said cables are wound, means for revolving said drums, whereby said passenger carrying device may be raised and lowered relatively to said carriage and a brake for automatically engaging one of said cables simultaneously with the lowering of said passenger carrying device.

6. In an apparatus of the class described, the combination with a carriage mounted on cables, of cables attached to said carriage, a passenger carrying device suspended on said cables, revolubly mounted drums upon which said cables are wound, means for revolving said drums, whereby said passenger carrying device may be raised and lowered relatively to said carriage, a propeller revolubly mounted on said passenger carrying device for moving said passenger carrying device along said first mentioned cables, and a brake for automatically engaging one of said cables simultaneously with the lowering of said passenger carrying device.

7. In an apparatus of the class described, the combination of a supporting cable, means for bracing said cable to prevent its sagging, a carriage mounted thereon, a plurality of cables suspended from said carriage, a passenger carrying device, drums revolubly mounted with their bases secured to said passenger carrying device, some adapted to be manually operated and the others operated by means of a gyroscope operating a rheostat whereby said drums are synchronized and said passenger carrying device maintains its equilibrium when being raised and lowered by the winding of said cables on said drums and a brake for engaging one of said cables simultaneously with the lowering of said passenger carrying device.

8. In an apparatus of the class described, the combination of a supporting cable, a carriage mounted thereon, a plurality of cables suspended from said carriage, a passenger carrying device, drums revolubly mounted with their bases secured to said passenger carrying device, some adapted to be manually operated and the others operated by means of a gyroscope operating a rheostat, whereby said drums are synchronized and said passenger carrying device maintains its equilibrium when being raised and lowered by the winding of said cables on said drums, means for propelling said passenger carrying device, and a brake for engaging one of said cables simultaneously with the lowering of said passenger carrying device.

9. In an apparatus of the class described, the combination of a supporting cable, means for supporting said cable to prevent its sagging, a carriage mounted thereon, a plurality of cables suspended from said carriage, a passenger carrying device, drums revolubly mounted with their bases secured to said passenger carrying device, some adapted to be manually operated and the others operated by means of a gyroscope operating a rheostat, whereby said drums are synchronized and said passenger carrying device maintains its equilibrium when being raised and lowered by the winding of said cables on said drums, means for propelling said passenger carrying device, means for steering said passenger carrying device, and a brake for engaging one of said cables simultaneously with the lowering of said passenger carrying device.

10. An apparatus of the class described, including a carriage mounted on cables, cables attached to said carriage, a passenger carrying device suspended on said cables, means coöperating with said cables for raising and lowering said passenger carrying device relatively to said carriage and a brake for automatically engaging one of said cables simultaneously with the lowering of said passenger carrying device.

In testimony whereof, I have hereunto set my hand at San Diego, California, this 20th day of January, 1919.

ALPHONSO DAVINO.